United States Patent [19]

Hamm et al.

[11] Patent Number: 4,931,653

[45] Date of Patent: Jun. 5, 1990

[54] IONIZING RADIATION DETECTOR SYSTEM

[75] Inventors: Robert N. Hamm, Knoxville; Scott R. Hunter, Oak Ridge; George S. Hurst, Oak Ridge; James E. Turner, Oak Ridge; Harvel A. Wright, Knoxville, all of Tenn.

[73] Assignee: Pellissippi International, Knoxville, Tenn.

[21] Appl. No.: 207,723

[22] Filed: Jun. 16, 1988

[51] Int. Cl.$^5$ .............................................. G01T 1/205
[52] U.S. Cl. ............................ 250/385.1; 250/361 R; 250/363.01; 250/386; 250/387
[58] Field of Search ...................... 250/385.1, 386, 387, 250/363.01, 362, 361 C, 361 R

[56] References Cited

U.S. PATENT DOCUMENTS 3,412,246  11/1968  Horwitz et al. ................. 250/363.01
4,031,396   6/1977  Whetten et al. ................. 250/385.1

FOREIGN PATENT DOCUMENTS 0087067  7/1980  Japan ............................... 250/361 R

OTHER PUBLICATIONS

Wesley E. Bolch, J. E. Turner, R. N. Hamm, H. A. Wright and G. S. Hurst, "A Method of Obtaining Neutron Dose and Dose Equivalent from Digital Measurements and Analysis of Recoil-Particle Tracks", *Health Physics*, vol. 53, No. 3 (Sep. 1987), pp. 241–253; ©1987, Health Physics Society.
S. R. Hunter, "Evaluation of a Digital Optical Ionizing Radiation Particle Track Detector", *Nuclear Instruments and Methods*, vol. A260 (1987), pp. 469–477; ©1987, Elsevier Science Publishers B.V.
S. R. Hunter, "Evaluation of a Digital Optical Ionizing Radiation Particle Track Detector", Oak Ridge National Laboratory Report ORNL/TM-10421 (Jun. 1987).
G. Cavalleri, "Measurement of Lateral Diffusion Coefficients and First Townsend Coefficients for Electrons in Helium by an Electron-Density Sampling Method", *Physical Review*, vol. 179, No. 1 (Mar. 5, 1969), pp. 186–202.
Conde et al., "An Argon Gas Scintillation Counter with Uniform Electric Field", *IEEE Transactions on Nuclear Science*, vol. NS-22, Feb. 1975, pp. 104–108.
Thiess et al., "New-Infrared and Ultraviolet Gas-Proportional Scintillation Counters", University of Illinois, pp. 125–145.
Jack Sandweiss, "The High-Resolution Streamer Chamber", *Physics Today* (Oct. 1978), pp. 40–45.

Primary Examiner—Constantine Hannaher
Attorney, Agent, or Firm—Pitts and Brittian

[57] ABSTRACT

An optical ionizing radiation detector system (10) for determining the three-dimensional spatial distribution of all of the secondary electrons produced by the passage of ionizing radiation through a selected gas is provided. The detector system (10) can be used over a wide range of particle energies and gas pressures. The ionizing radiation passing through the gas produces prompt fluorescence and secondary electrons. A coincidence detector (30) recognizes coincident events of prompt fluorescence in the gas contained within that chamber to initialize the system cycle. At that time, an AC electric field is generated by an R.F. pulse generator (40) to localize the secondary electrons proximate their respective positions of production. Cameras (42) and 42'), preferably of a digital type, produce an image of the localized electrons to determine their three-dimensional spatial positions. After such positions are determined, a unidirectional electric field is generated by clearing power supply (36) for clearing all charges from the gas chamber.

12 Claims, 1 Drawing Sheet

IONIZING RADIATION DETECTOR SYSTEM

TECHNICAL FIELD

This invention relates to an ionizing radiation detector system for accurately measuring and imaging the three-dimensional positions of electrons produced by ionizing radiation colliding with a selected gas in a detector chamber.

BACKGROUND ART

Measurement of the details of the interactions of ionizing radiation with matter is a principal area of study in the fields of radiation physics, radiation protection and dosimetry. When ionizing radiation penetrates or passes through a gas and collides therewith, it produces electrons which in turn cause other ionizations and the production of additional electrons. Electrons are quickly thermalized. The system of the present invention measures the position of each of the thermal electrons produced and provides information concerning the three-dimensional spatial distribution of such electrons. Additionally, the system can be used in connection with the measurement of the quality of a laser beam and determining its three-dimensional profile. For example, when a laser beam penetrates a gas it produces ionizations, either by direct photon absorption or through resonance ionization, and the number of electrons produced in a given subvolume of the gas depends on the laser beam intensity therein. A measurement of the numbers of electrons produced in different subvolumes of a selected gas enables a determination of the three-dimensional beam profile.

Heretofore, devices commonly referred to in the literature as "streamer chambers" have been used to gather data concerning electron tracks produced in gases by ionizing radiation. Typically, streamer chambers apply a large DC pulse to enhance the production of ionized particles in the gas. The pulse is applied until image streamers, bright continuous tracks, are produced within the gas. However, streamer conditions produce space charge effects, i.e., the field generated by the electrons themselves approximates the order of magnitude of the applied electric field. Further, one is unable to gather data in a streamer chamber concerning the number of electrons produced in the electron track generated by the ionizing radiation.

When space charge effects are produced within the gas, the electric field becomes distorted, and the electron growth is non-linear. In such a situation, the representation of the electrons initially produced in the track is inaccurate. Moreover, in streamer chambers the presence of the track can be viewed, but the number of electrons therein cannot be determined. Streamer chambers also involve, in certain embodiments, complex chamber constructions together with complex electrode shapes and configurations. Moreover, sophisticated electronics are commonly required to determine the position of the electron tracks.

Accordingly, it is an object of the present invention to provide an ionizing radiation detector system capable of imaging the position of each electron produced in a particle track by ionizing radiation traveling through a gas and colliding therewith.

It is also an object of the present invention to provide means for determining the three-dimensional spatial position of each electron produced.

Another object of the invention is to provide a simpler system for imaging the position of each electron which avoids the need of drift chambers, or complex electrode shapes and configurations.

Yet another object of the present invention is to provide such a system which can be used in connection with the analysis of the electromagnetic spectrum from visible through gamma-ray radiation.

DISCLOSURE OF THE INVENTION

An ionizing radiation detector system for imaging the position of each electron produced in a particle track by ionizing radiation traveling through, and colliding with, a fluid such as gas is provided. The detector system includes a fluid or detection chamber containing a selected fluid such as gas under pressure. A source of ionizing radiation passes radiation into the gas to produce prompt fluorescence and secondary electrons. Coincident events of prompt fluorescence in the gas are detected and at that point, the system cycle begins. During this cycle, an electric field is generated, in the preferred embodiment, by an R.F. generator for localizing the secondary electrons proximate their respective positions of production. Cameras serve to produce an image of the localized electrons to determine their respective three-dimensional spatial positions. After the appropriate spatial position data are gathered, an electric field is generated for clearing all charges from the gas chamber. The system then awaits the detection of further coincident events of prompt fluorescence, at which time another cycle occurs until a desired quantity of data is collected and stored.

BEST MODE FOR CARRYING OUT THE INVENTION

Figure 1:
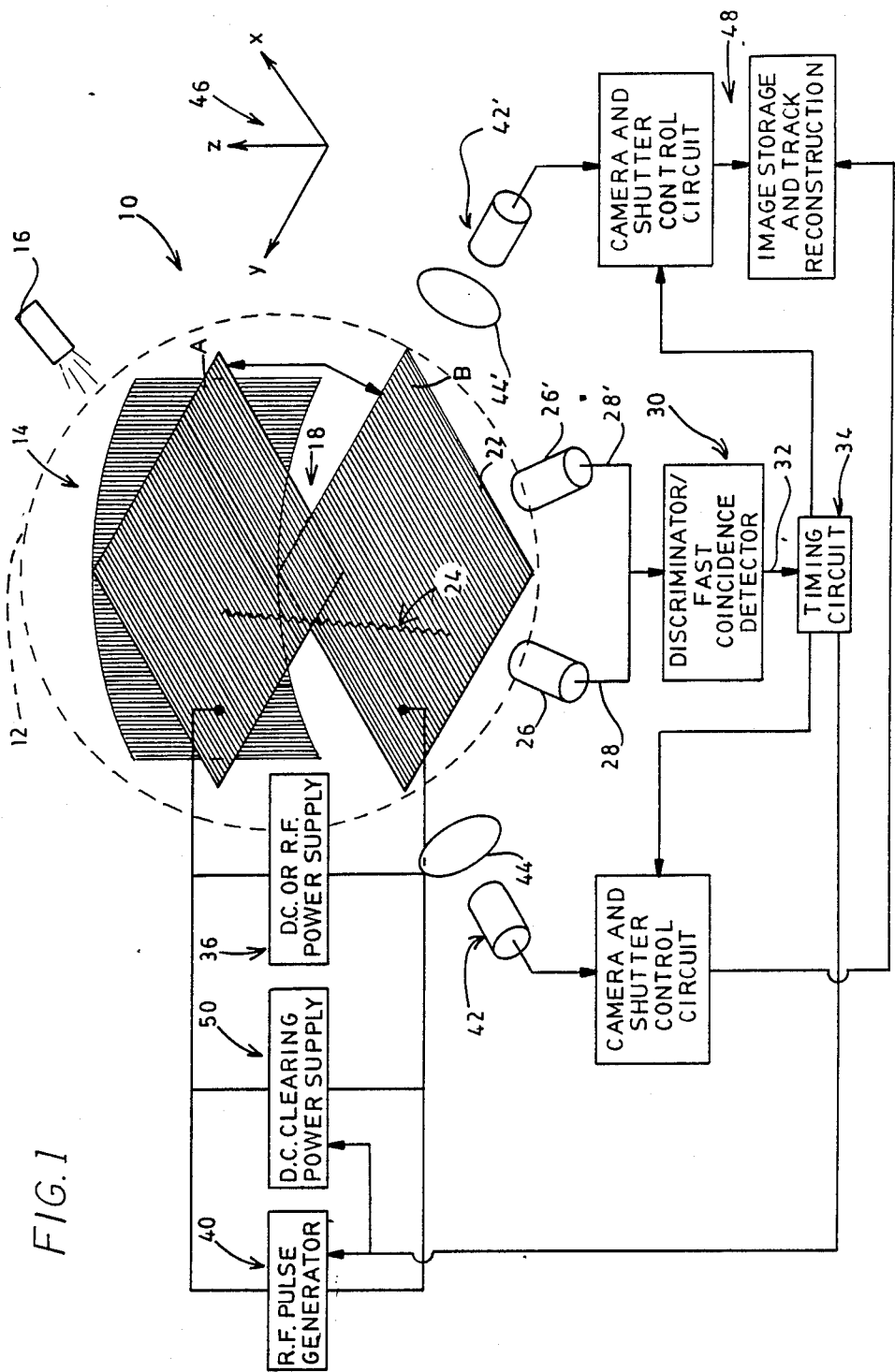
FIG. 1 illustrates an optical ionizing radiation detector system constructed in accordance with various features of the present invention.

An ionizing radiation detector system constructed in accordance with various features of the present invention is illustrated generally at 10 in FIG. 1. The invention resides in the combination of the various system components in a manner to image and store data concerning, and discern the position of, each electron produced in a particle track by ionizing radiation traveling through a gas. The individual system components are either commercially available or described in related literature. Moreover, certain features of the present invention have been described in a publication entitled "Evaluation of a Digital Optical Ionizing Radiation Particle Track Detector", authored by S. R. Hunter, and published by the OakRidge National Laboratory on June 23, 1987. This article is incorporated by reference herein.

The ionizing radiation detector system shown in FIG. 1 is generally referred to at 10. The detector system 10 is preferably of the optical type and includes a detection chamber illustrated diagrammatically at 12. This chamber is defined by a suitable wall geometry illustrated diagrammatically and includes a wall section or window 14 which is transparent to ionizing radiation of a selected type. Preferably, the walls of the chamber, or a section of the walls, are transparent to optical radiation produced within the chamber. For example, the chamber walls can be made of polypropylene, polyethylene or other tissue equivalent material which can be used in neutron dosimetry applications. Moreover, the walls of the chamber can be made of any type of solid material allowing the track 24 to be characterized in such material using the known Bragg-Gray principle. Also, the window material can be chosen such that it will transmit a laser beam to be characterized by the system in three dimensions.

In FIG. 1, a source 16 of ionizing radiation is illustrated diagrammatically and aimed in the direction of the window 14. The window 14 construction and the source of ionizing radiation 16 are correlated such that radiation of a selected type passes through the window 14 and travels into pressurized (in the preferred embodiment) gas or other fluid contained within the chamber 12. For example, if it is desired to use beta rays as the source, instead of alpha rays, a window is selected with a thickness sufficient to block the alpha rays and allow the beta rays to travel into the chamber 12. Similarly, a thicker window can be used to filter out beta rays but allow gamma rays to enter the chamber.

Ionizing particles of radiation passing through the window 14 collide with a fluid medium such as gas contained therein proximate the location of the referenced numeral 18 and produce secondary electrons. In this connection, the particular features and properties of the fluid medium (gas hereinafter) are selected by conventional techniques such that when the ionizing particles of radiation generated by the source 16 collide with the gas, prompt fluorescence within the visible or ultra-violet range is produced. This prompt fluorescence normally occurs within approximately ten nanoseconds of the passage of the ionizing radiation into the location indicated by numeral 18 of a gas. Detection of the prompt fluorescence in the preferred embodiment serves to trigger the commencement of a system cycle as will be described in greater detail hereinafter.

It is also desirable for the gas contained within the chamber to have a low "W" value such that it produces a substantial number of ionizing collisions for a given energy input from the radiation source. The low "W" value thus means that the gas can be easily ionized to produce a large number of secondary electrons. Further, it is desirable that the gas has a high cross-section for the production of ultra-violet to visible radiation upon electron impact. This enhances the ability of a gas to produce prompt fluorescence. It will also be recognized by those skilled in the art that the ionization rate and capacity can be adjusted by varying the pressure of the gas within the chamber 12 by conventional techniques. Suitable ionizing gas can be a rare gas such as He, Ne, Ar, Kr, or Xe. The ionizing gas can also be a mixture of two or more of the above rare gases. Moreover, the ionizing gas can be a mixture of one or more of the mentioned rare gases in combination with $N_2$ and/or $CH_4$.

Also, the ionizing gas can include in combination, with the mixtures mentioned above, a low ionization threshold gas such as triethylamine (TEA) or tetrakis-dimethylaminoethylene (TMAE). It may also be desirable for the gas and its pressure to be chosen such that it will produce short tracks of electrons suitable for x-ray imaging. In certain applications, the gaseous medium can be chosen such that it can be ionized in resonance steps using lasers, or the gaseous medium can be chosen such that it is suitable for non-resonant photo-ionization. Further, the gaseous medium can be chosen such that it contains a high atomic mass gas such as Xe in combination with a low ionization threshold gas such as TMAE at large total gas pressures suitable for gamma ray imaging by pair production processes.

It will be recognized by those skilled in the art that the size of the chamber 12 and the pressure on the gas at 18 will vary depending upon the nature of the gas and the particular type of radiation source 16. For example, if alpha particle radiation is applied to a gas having a high atomic mass, many ionizations will occur per cubic centimeter for a given unit of gas pressure. In this application, it is desired to have a small chamber and a low pressure applied to the gas.

A pair of electrodes 20 and 22 are enclosed within the chamber 12 having a selected configuration. The illustrated electrodes are substantially similar in configuration and planar in the illustrated embodiment. They are positioned such that ionizing gaseous medium is disposed therebetween. That is, they are positioned above and below the gas or gaseous medium deposed at location 18 and are used to generate an electric field therebetween. This field, as will be described in greater detail hereinafter, enhances the control administered to the electron track 24 which is produced by the passage of the ionizing radiation/particles into the chamber 18 where a collision with the gas occurs. The electrodes are preferably transparent to optical radiation produced in the chamber 12.

As mentioned generally above, the gas is preferably chosen such that prompt fluorescence within the visible to ultra-violet range is produced when the ionizing radiation collides with the gas. This prompt fluorescence is detected to commence the system cycle. More specifically, fluorescent radiation is preferably detected by one or more photomultipliers in a fast timing coincidence circuit. To this end, a pair of photomultipliers of conventional design are illustrated generally at 26 and 26'. These photomultipliers commonly have photocathodes with a very low work function, i.e., 1–3 ev. Commonly they use cesium or iodide as a photo-conducting material on the windows which allow the passage of ultra-violet or visible radiation. Generally they have quantum efficiencies which are in the range of 20–30 percent from ultra-violet to visible range. A detectable electrical signal is produced at their outputs 28 and 28' in response to a photon from the prompt fluorescence striking the window of the photomultipliers.

The outputs of the photomultipliers are fed to the DISCRIMINATOR/FAST COINCIDENCE DETECTOR illustrated generally at 30. The coincident detector portion of the circuitry 30 correlates radiation produced from the distinct photomultipliers 26 and 26'. It is a commercially available device. More specifically, when both photomultipliers detect a photon within a set time interval, e.g. a few nanoseconds to about 50 nanoseconds, a pulse is produced at the output 32 of the DISCRIMINATOR/FAST COINCIDENCE CIRCUITRY to commence the system cycle. The coincident events of prompt fluorescence within the gas chamber and within the selected time interval provides indicia that the photons are produced by a particle track 24 within the gas of chamber 12 rather than from scattered light due to natural activity within the chamber. Thus, the system reads the fast coincident events (within a specified time interval) as the production of an electron track.

The discriminator portion of the circuitry 30 is commercially available and serves to filter out low signal noise. This device also serves to set the threshold level for the trigger event, i.e., the coincident occurrence of incident photons onto the photomultipliers 26 and 26' within a specified time interval which usually is in the range of a few nanoseconds to 50 nanoseconds.

When coincident events of prompt fluorescence are detected, a signal is produced at the output 32 of the DISCRIMINATOR/FAST COINCIDENCE DETECTOR circuitry 30 to energize timing circuit 34. This timing circuit 34 is of a conventional design and controls the sequence of energizing various components of the system 12. More specifically, this timing circuit starts the system cycle, turns various of the system components on, resets the system, and readies it for recommencing the cycle upon a subsequent occurrence of coincident detection of prompt fluorescence.

Circuitry labeled 36 comprises a DC or R.F. POWER SUPPLY. This circuitry is always on during system use and supplies power to the electrodes 20 and 22. As electrons are produced in the gas by the ionizing radiation colliding therewith, electrons and positive ions are produced next to each other. This power supply 36 serves to create a field between the electrodes 20 and 22 such that the electrons are prevented from recombining with the positive ions which would cause a loss of ionization and thus a detection of less ionization than was in fact produced in the electron track 24. Thus, the power supply 36 enhances the capability of the system to image complete charg detection.

Electric field generation means are provided for localizing secondary electrons produced by the collision of the ionizing radiation with the gas. These secondary electrons are localized proximate their respective positions of production in the preferred embodiment by a R.F. pulse generator generally indicated at 40. This pulse generator is in part commercially available and enhancements have been described in greater detail in G. Cavalleri, "Measurements of Lateral Diffusion Coefficients and First Townsend Coefficients for Electrons in Helium by an Electron-Density Sampling Method," *Physical Review*, Vol. 179, No. 1 (Mar. 5, 1969) pp. 186–202. The R.F. pulse generator 40 localizes the secondary electrons near their positions of production to enhance the spatial resolution of the system. It is initially turned on or triggered simultaneously with the cameras 42 which will be described in greater detail hereinafter. More specifically, the R.F. pulse generator is triggered by a voltage pulse produced at the output 32 of the timing coincidence circuit 30. The R.F. pulse generator 40, applied a high R.F. voltage pulse between the two electrodes 20 and 22 in the detection chamber 12. Electrons in the track 24 are then accelerated within the field created by the R.F. pulses application to the electrodes. These electrons gain energy and start colliding with surrounding gas and producing ionization and excitation in such gas. The ionization produces external electrons which in turn through collision with the gas repeat the process. Thus, there is a exponential growth in the number of electrons produced in the gas. The excitations then decay to a ground state producing photons. These photons serve as the light output from the track 24 which is detected by the two cameras 42.

The R.F. pulse causes the electrons to travel backwards and forwards towards the electrodes 20 and 22. That is, they oscillate from their positions of production, but are not accelerated in one direction only as would be the occurrence if a DC pulse caused the electrons to accelerate.

As indicated above, the cameras are turned on simultaneously with the R.F. pulse generator in a preferred embodiment. Turning the cameras on only after the detection of coincident events of prompt fluorescence assists in preventing the detection and imaging of background noise or fluorescence occurring naturally within the detection chamber 12. Thus, the statistics are enhanced without the need for background substraction since the timing circuit simultaneously energizes the R.F. pulse generator 40 and the cameras 42.

Optical radiation produced in the chamber 12 is preferably imaged by 2 two-dimensional digital video cameras 42 and 42'. In the preferred embodiment, the cameras 42 and 42' are operatively associated with conventional imaging optics 44 and 44', respectively. These cameras are positioned in a preferred embodiment such that their viewing angles (the direction of the axis of their fields of view) are perpendicular to each other. This allows the cameras to view optical activity within the detection chamber 12 along perpendicular axes such that camera 42 provides information concerning the position of electrons which are to be tracked with respect to the X-Z coordinates indicated at the coordinate system at 46 which is diagrammatically illustrated. Similarily, camera 42' provides information concerning the Y-Z coordinates of an electron to be tracked. By so positioning the cameras 42 and 42', the analysis and resolution of the spatial position of the electrons to be imaged is simplified. Thus, the two video cameras 42 and 42' image the radiation from the ionization or detection chamber 12 in planes perpendicular to each other forming a steroscopic image of the ionizing particle track 24. However, it will be recognized by those skilled in the art that the cameras need not necessarily be positioned with their fields of view at 90 degrees with respect to each other.

With camera 42 recording the position of the electron track in the X-Z plane, and with camera 42' recording the position of the electron track in the Y-Z plane, the three-dimensional position of each electron from these two images can be determined. This is accomplished by feeding the data gathered by the 2 two-dimensional cameras 42 and 42' to a computer generally indicated at 48 which serves to store the digitized information from the cameras and reconstruct the track such that the three-dimensional positions of each electron can be discerned from the correlation of the two two-dimensional cameras with respect to each other in the computer 48. More specifically, each of the two-dimensional cameras first records the particle track in the two-dimensional planes. These images are stored in the computer circuitry labeled IMAGE STORAGE AND TRACK RECONSTRUCTION, which also serves to correlate these two images together to produce data which concerns the three-dimensional position of each electron. Thus, the ionizing particle track is reconstructed to obtain the three-dimensional image of the particle track by combining the digital images produced by the video cameras 42 and 42'.

In order for the above imaging, recordation, and track reconstruction to take place, the electrons produced must provide enough photons such that each camera 42 and 42' detects at least one photon from each electron in the initial secondary track produced by the collision of the ionizing radiation and the gas. To this end, the device must be calibrated by conventional calibration techniques which are accomplished external to the system. Calibration is accomplished in a conventional manner by first knowing how much charge is produced, counting the number of photons and increasing or otherwise adjusting the voltage between the electrodes 20 and 22 until a proper match is produced between the number of photons and the total charges produced in the gas.

Moreover, the TIMING CIRCUIT 34 serves to turn on the system components during its cycle, including the R.F. pulse generator and the cameras, for a certain time interval which is long enough to detect one photon for each electron. The cameras 42 and 42' are then turned off by the TIMING CIRCUIT 34 such that no additional light or photons from the chamber are detected.

After the electron track is recorded, the TIMING CIRCUIT 34 energizes the DC clearing power supply 50. This power supply produces a low voltage DC clearing field between the two electrode plates 20 and 22. This clearing field is triggered by a time delayed pulse from the photomultiplier timing coincidence circuit 30. The unidirectional field exerts forces on the charged particles therein causing the electrons and ions to drift out of the detection or gas chamber 12. After all of the charged particles are cleared from the gas chamber, the TIMING CIRCUIT 34 turns the DC clearing supply 50 off and the system is readied by energizing the photomultipliers 26 and 26' and the DISCRIMINATOR/FAST COINCIDENCE DETECTOR CIRCUITRY 30 for the detection of another particle track within the detector chamber. As the images are developed and stored in the computer 48, the data can be analyzed to determine the total number of particles or for other applications as are necessary or desired. Since each of the electrons produced by the ionizing radiation in the gas of the detector chamber 12 can be imaged and stored it is envisioned that the system may have applications which would include: measurement of range straggling; measurement of energy-loss straggling; experimental checks of track structure calculations; measurement of microdosimetric distributions in much more detail than has ever before been possible—even the distributions along a single track; measurement of W-values (energy required to produce an ion pair); measurement of fluctuations in W-values; particle identifier; measurement of Fano factors; simultaneous measurement of energy absorbed and Linear Energy Transfer, LET; neutron dosimeter; neutron spectrometer; characterization of laser beams by measuring ionization produced by the beam; determine spatial distribution of specific types of atoms in a gas using resonance ionization of said atoms; and simultaneous characterization of beam size, divergence, and attenuation of x-ray beams, for example, to study dose reduction for dental x-rays. These are only specific examples of more general applications of the system of the present invention. Further, the detector system should be useful whenever it is desirable to characterize the beam profile or the interaction profile of any agency which can create thermal electrons.

From the foregoing detailed description, it will be recognized that an optical ionizing radiation detector system has been provided for detecting the positions of all electrons produced during ionization events in a gas or fluid medium. The system records the particle tracks in digital form for later analysis. When ionizing radiation enters the detection chamber, it collides with the gas in the chamber to produce a track of secondary electrons. The electrons in the particle track are excited by the presence of a high-frequency AC electric field (R.F. pulse), and two digital cameras image the optical radiation produced in electronic excitation collisions of the surrounding gas by the electrons. The system incorporates an important feature of simultaneously measuring the number and spatial distribution of ionizations produced in different subvolumes of the chamber which thus constitute a digital characterization of the ionization produced by the ionizing particles. The system also includes a feature of employing optical techniques for the detection of ionizing events in the gas. External control of the particle track resolution and detection sensitivity can be accomplished by manipulation of the gas (species composition, pressure) R.F. pulse (frequency, duration, magnitude) and video camera characteristics (aperture size, shutter speed, detector type). This flexibility enables the system to be optimized to detect different types of ionizing radiation over a wide range of energies. Moreover, the ionizing radiation can be in the form of charged particles, recoiled particles, laser beam, etc.

In operation, the gas between the electrodes is ionized in collisions with the high-frequency primary radiation and the secondary electrons to produce a track of low energy electrons in the gas. A small continuous R.F. (f approximately equals 10–100 MHz) or DC field ($E/P$ approximately equals 0.1 –1.0 V cm$^{-1}$ torr$^{-1}$) is applied across the electrode plates to "heat" the electrons in the chamber above thermal energy so as to prevent electron-positive ion recombination from removing electrons before imaging.

The high energy ionizing radiation and secondary electrons will electronically excite as well as ionize the gas or gas mixture and the prompt decay of these excited atoms or molecules will produce a small burst of optical radiation which can then be detected by the two wide angle, fast, high sensitivity photomultipliers. Signals from the photomultipliers are amplified and fed into a fast discriminator-coincidence detector where a trigger pulse is produced when two photomultiplier pulses are detected within a given coincidence window (T approximately equals 0–50 ns). This trigger pulse is fed into the master timing circuit which in turn triggers a high voltage (5–50 kV) highly damped (decay time t approximately equals 100 ns −1 μs) R.F. pulse generator (f approximately equals 20-100 MHz). The R.F. pulse from this generator is applied across the plates in the detector and excites the electrons in the particle track.

The R.F. field causes the electrons to rapidly oscillate, gaining sufficient energy to ionize and electronically excite the surrounding gas, and consequently to produce a pulse of light whose intensity is proportional to the magnitude and duration of the R.F. pulse. The frequency of the pulse generator is preferably adjusted such that the average energy of the electrons remains essentially constant during one period of the field (this sets the lower limit on the frequency) but at the same time the electron momentum follows the alternating field (i.e., low enough such that the electron experiences several collisions with the surrounding gas during one period of the field). The gas within the detector is chosen to have a high gas ionizing efficiency (i.e., low ionization threshold and W value), but more importantly, to have a high quantum yield for the production of prompt (decay times less than or approximately equal to 10 ns) UV to visible (300–600 nm) radiation. The amplitude and duration of the R.F. pulse is chosen such that every electron in the track produces a detectable pulse of light in both of the detector cameras.

The two-dimensional digital detector cameras can either be silicon intensified vidicon cameras or microchannel plate intensified charged coupled device (CCD) or similar semiconductor cameras which are available commercially. These cameras preferably have large pixel arrays (greater than or approximately equals 500×500 pixels) to accurately image the optical radiation produced by the excitation of the electrons in the detector. The resolution of the detector is proportional to the size of the pixel arrays in the camera. The cameras, which are triggered by a pulse from the master timing circuit 32 have variable exposure times which are adjustable (10 ns—1 μs) to ensure that at least one detectable photon is recorded by both cameras for every electron in the track. The two cameras image the track 24 in the X-Z and Y-Z planes, and the digitally stored track image is transferred to a computer (48) for permanent storage, track reconstruction, and analysis.

After the imaging of the particle track is complete, a small DC clearing field is applied across the detector plates or electrodes 20 and 22 to clear the electrons and ions from the detector chamber, and the detection circuits are reset to record a second particle track. More specific details of the operation of the detector can be found in the following publications which are incorporated by reference herein: S. R. Hunter, "Evaluation of a Digital Optical Ionizing Radiation Particle Track Detector," Oak Ridge National Laboratory Report ORNL/TM-10421 (June 1987); S. R. Hunter, "Evaluation of a Digital Optical Ionizing Radiation Particle Track Detector," *Nuclear Instruments and Methods*, Vol. A260 (1987) pp. 469–477; and W. E. Bolch, J. E. Turner, R. N. Hamm, H. A. Wright and G. S. Hurst, "A Method of Obtaining Neutron Dose and Dose Equivalent From Digital Measurements and Analysis of Recoil-Particle Tracks," *Health Physics*, Vol. 53, No. 3 (September 1987) pp. 241–253.

While the preferred embodiment has been shown and described, it will be understood that there is no intent to limit the invention by such disclosure, but rather it is intended to cover all modifications and alternate constructions falling within the spirit and scope of the invention as defined in the appended claims.

We claim:

1. An ionizing radiation detector system comprising:
   a chamber containing a selected fluid;
   a source of ionizing radiation which passes ionizing radiation into said fluid to produce thermal electrons;
   dynamic electric field generating means for proportional amplification of the number of said thermal electrons and for localizing said thermal electrons proximate their respective positions of production; and
   means for measuring the number and spatial distribution of at least one of said localized thermal electrons.

2. The ionizing radiation detector system of claim 1 wherein said means for measuring the spatial distribution of said localized thermal-electrons comprises an optical device.

3. An optical ionizing radiation detector system comprising:
   a gas chamber containing a selected gas under pressure;
   a source of ionizing radiation which passes ionizing radiation into said gas to produce prompt fluorescence and thermal electrons;
   means for detecting prompt fluorescence in said gas chamber for commencing the system cycle;
   dynamic electric field generation means for localizing said thermal electrons proximate their respective positions of production;
   camera means for producing an image of said localized electrons to determine their number and spatial positions; and
   further electric field generation means for clearing all charges from said gas chamber.

4. The system of claim 3 including timer means for controlling the cycle of said system.

5. The system of claim 4 wherein said timer means commences the controlled cycle of said system upon the detection of prompt fluorescence and terminates the cycle of said system when said charges are cleared from said chamber.

6. The system of claim 3 including first and further electrodes positioned at spaced locations within said chamber such that gas is disposed between said electrodes.

7. The system of claim 6 wherein said means for localizing said thermal electrons proximate their position of production comprises a time dependent field generator having an output connected to said first and further of said electrodes such that application of the time dependent field to said electrodes causes said thermal electrons to oscillate about their respective positions of production.

8. The system of claim 3 wherein said camera means comprises first and further cameras positioned such that their directions of viewing gas within said chamber are at separate viewing angles to provide information concerning the location of said secondary electrons, and means for storing and correlating outputs from said cameras concerning spatial positions of said electrons to determine their respective three-dimensional positions within said chamber.

9. The system of claim 3 wherein said cycle commencement means consists of the detection of the coincidental occurrence of a number of prompt fluorescence events within a preselected time interval.

10. An optical ionizing radiation detector system comprising:
    a gas chamber containing a selected gas under pressure;
    a source of ionizing radiation which passes ionizing radiation into said gas to produce prompt fluorescence and thermal electrons;
    means for detecting coincident events of prompt fluorescence in said gas chamber for commencing the system cycle;
    electric field generation means for localizing said thermal electrons proximate their respective positions of production;
    camera means for producing an image of said localized electrons to determine their number and spatial positions;
    further electric field generation means for clearing all charges from said gas chamber;
    first and further electrodes positioned at spaced locations within said chamber such that gas is disposed between said electrodes; and
    means for localizing said thermal electrons proximate their position of production, comprising an R.F. pulse generator having an output connected to said first and further of said electrodes such that application of an R.F. pulse to said electrodes causes said thermal electrons to oscillate about their respective positions of production.

11. An optical ionizing radiation detector system comprising:
- a gas chamber containing a selected gas under pressure;
- a source of ionizing radiation which passes ionizing radiation into said gas to produce prompt fluorescence and thermal electrons;
- means for detecting coincident events of prompt fluorescence in said gas chamber for commencing the system cycle;
- electric field generation means for localizing said thermal electrons proximate their respective positions of production;
- camera means for producing an image of said localized electrons to determine their number and spatial positions;
- further electric field generation means for clearing all charges from said gas chamber;
- camera means comprising first and further cameras positioned such that their directions of viewing gas within said chamber are perpendicular such that each camera images two-dimensional information concerning the location of said secondary electrons; and
- means for storing and correlating outputs from said cameras concerning spatial positions of said electrons to determine their respective three-dimensional positions within said chamber.

12. An optical ionizing radiation detector system comprising:
- a gas chamber containing a selected gas under pressure;
- a source of ionizing radiation which passes ionizing radiation into said gas to produce prompt fluorescence and thermal electrons;
- means for detecting coincident events of prompt fluorescence in said gas chamber for commencing the system cycle;
- electric field generation means for localizing said thermal electrons proximate their respective positions of production;
- camera means for producing an image of said localized electrons to determine their number and spatial positions;
- further electric field generation means for clearing all charges from said gas chamber; and
- means for detecting coincident events of prompt fluorescence comprising a coincidence detector which detects a plurality of prompt fluorescence events within a preselected time interval representative of the occurrence of a particle track in said gas chamber.

* * * * *